United States Patent [19]

Mehmet

[11] Patent Number: 4,923,615
[45] Date of Patent: May 8, 1990

[54] FLUID/SOLID CONTACTING COLUMNS

[75] Inventor: Ahmet Mehmet, Johannesburg, South Africa

[73] Assignee: Council of Mineral Technology, South Africa

[21] Appl. No.: 317,469

[22] Filed: Mar. 1, 1989

Related U.S. Application Data

[63] Continuation-in-part of Ser. No. 171,932, Mar. 22, 1988, abandoned.

[30] Foreign Application Priority Data

Mar. 26, 1987 [ZA] South Africa ............... 87/2228

[51] Int. Cl.$^5$ ............................... B01D 15/02
[52] U.S. Cl. .................... 210/661; 210/676; 210/684; 210/688; 210/189; 210/268
[58] Field of Search ............... 210/661, 676, 684, 688, 210/694, 189, 268; 423/25

[56] References Cited

U.S. PATENT DOCUMENTS

| | | | |
|---|---|---|---|
| 2,742,381 | 4/1956 | Weiss et al. | 210/268 |
| 3,935,006 | 1/1976 | Fischer | 210/688 |
| 3,957,635 | 5/1976 | Cloete et al. | 210/189 |
| 4,298,696 | 11/1981 | Emmett | 210/189 |

Primary Examiner—Ivars Cintins
Attorney, Agent, or Firm—Mason, Fenwick & Lawrence

[57] ABSTRACT

A liquid/solid contacting column and method of operating same is provided. The column is of the type in which a vertical series of stages is defined by vertically spaced perforated plates or trays which allow for forward flow up the column during which solid adsorbent in a fluidized state is contacted by liquid flowing up the column, and flow of solid adsorbent and liquid down the column during a reverse flow part of the operating cycle. The column is provided with outlet means in the form of one or more ports or ducts for a stream of liquid and solid adsorbent from the space above the lowermost plate or tray and wherein such outlet means is located at a predetermined height above said lowermost plate or tray.

13 Claims, 2 Drawing Sheets

FLUID/SOLID CONTACTING COLUMNS

This application is a continuation-in-part, of application Ser. No. 171,932, filed Mar. 22, 1988, now abandoned.

FIELD OF THE INVENTION

This invention relates to fluid/solid contacting columns and, more particularly, to columns comprising a plurality of stages defined by perforated plates spaced apart vertically within the column and which are employed for multi-stage countercurrent contacting of a fluid, usually a liquid, containing a dissolved ion, and a solid adsorbent chosen to adsorb such ion.

BACKGROUND TO THE INVENTION

Fluid/solid contacting columns comprising a plurality of vertically spaced perforated plates in a column and wherein solid adsorbent is fed to the top of the column and loaded solution to the bottom of the column to effect multi-stage countercurrent extraction of the required dissolved materials, are well known.

One such type of column is described in U.S. Pat. No. 2,742,381 to Weiss et al. In this type of column, which operates on a continuous countercurrent flow with the solid absorbent being retained on the plates by weirs on the edges of plates or trays which do not span the entire cross-sectioned area of the column to leave communication passages between stages, there is little or no control of the flow of the adsorbent as the onward flow of solids down the column is dependant on the size and density of the individual solid particles. Thus lighter and smaller particles will flow through the column preferentially whilst heavy particles can become held up in a stage. With this arrangement solid adsorbent is only transferred from one stage to another by overflow i.e. when an excess is present on the tray.

Another type of column is described and claimed in U.S. Pat. No. 3,957,635 entitled "Contacting liquids and solids in countercurrent". In this type of column the plates or trays are perforated and span the entire cross-sectioned area of the column. The perforations may be fitted with bubble caps.

Columns of the latter general type, and which are of concern here, operate by causing the fluid to flow in opposite directions intermittently with velocities chosen to provide different parts of a composite cycle which include; a first part which comprises forward flow of liquid up the column during which adsorption takes place and the solid adsorbent is fluidised; a second part in which liquid flow is ceased and solid adsorbent is allowed to settle onto the plates or trays; and a third part in which flow of liquid is reversed to cause solid adsorbent to move to a lower plate or tray irrespective of the size or weight of individual particles, this third part being followed by the first part of the next cycle.

Ideally, and in order to prevent unwanted backmixing of the solid adsorbent, all of the adsorbent on one plate or tray would be moved to the next lower plate or tray during the third part of a cycle. The reason for this is that backmixing results in a loss of efficiency of the process. Also, it is important that each plate or tray has substantially the same quantity of solid adsorbent above it so that, in effect, a plug type of flow can be set up during the third part of the cycle.

Prior to the invention of U.S. Pat. No. 3,957,635, difficulties were experienced in that there tended to be a loss of solid adsorbent from the bottom stage of the column in consequence of excessive quantities of adsorbent leaving through the lowermost stage or plate. This was overcome by the expedient set forth and claimed in said U.S. patent, namely by limiting the quantity of solid adsorbent which could pass through the lowermost plate or tray to a quantity less than that passing through the other plates or trays. The forward or first part of a cycle would then result in a redistribution of the solid absorbent over the various stages. These columns operated effectively with the types of solid adsorbent, in particular ion exchange resins, employed heretofore.

However, it has now been found that, in some cases, an excessive accumulation of solid adsorbent, such as activated carbon, when the particles are of a less regular shape, can develop in the lower stages of the column.

It is the object of this invention to provide a method of operating a column of the above type as well as an improved column in which the difficulties experienced at least with certain types of solid adsorbent are overcome or, at least, diminished.

SUMMARY OF THE INVENTION

In accordance with one aspect of this invention there is provided a method of operating a multi-stage fluid/solid contacting column comprising a series of vertically spaced perforated plates or trays defining a vertical series of stages, and wherein the cycle of operation includes a first part in which a forward flow of loaded solution up the column to contact fluidised solid adsorbent therein takes place, and a subsequent reverse flow part during which solution flow is reversed to cause a mixture of solution and solid adsorbent to pass downwardly through the perforations in the perforated plates or trays to a stage below, the reverse flow part of the cycle including the step of removing a volume of solution and solid adsorbent through at least one duct having its inlet located at a predetermined height above the lowermost plate or tray, said volume including a quantity of solid adsorbent less than that which passes from one stage to another during said reverse flow part of the cycle.

Further features of the invention provide for the solid adsorbent to be activated carbon; for the loaded solution to contain dissolved gold values, in particular gold cyanide; for said stream of solution and solid adsorbent to be removed by way of ducts extending upwardly and laterally out of the side of the column and having their open inlet ends directed downwardly and opening into the space above the lowermost plate or tray; and for the cycle of operation to include a settling period between the forward flow part and reverse flow part thereof. Conveniently a plurality of outlet ducts can be used for withdrawing the stream of solution and solid adsorbent from the space above the lowermost plate or tray and the flow of such a stream can be regulated by means of one or more valves in such pipes.

The outlet ducts are generally positioned at a height above the lowermost plate or tray of about 10% to 15% of the height between adjacent plates or trays, in particular between the lowermost plate or tray and the next higher plate or tray. This ensures that some solid adsorbent is left on the lowermost tray to thereby cause less solids to be removed from the lowermost plate or tray than is transferred from one stage to another.

The invention also provides a solid/fluid contacting column comprising a plurality of vertically spaced perforated plates or trays, the lowermost of which is operative to prevent the passage of solid adsorbent therethrough whilst the remainder are operative to allow passage of solid adsorbent therethrough during settling and reverse flow cycles, the column having at least one outlet duct having an inlet communicating with the space above the lowermost plate or tray at a predetermined height above such lowermost plate or tray and flow regulating means associated with the outlet duct for controlling the flow of liquid and solid adsorbent therethrough.

In order that the invention may be more fully understood, one embodiment thereof will now be described with reference to the accompanying drawings.

DETAILED DESCRIPTION WITH REFERENCE TO THE DRAWINGS

Figure 1:
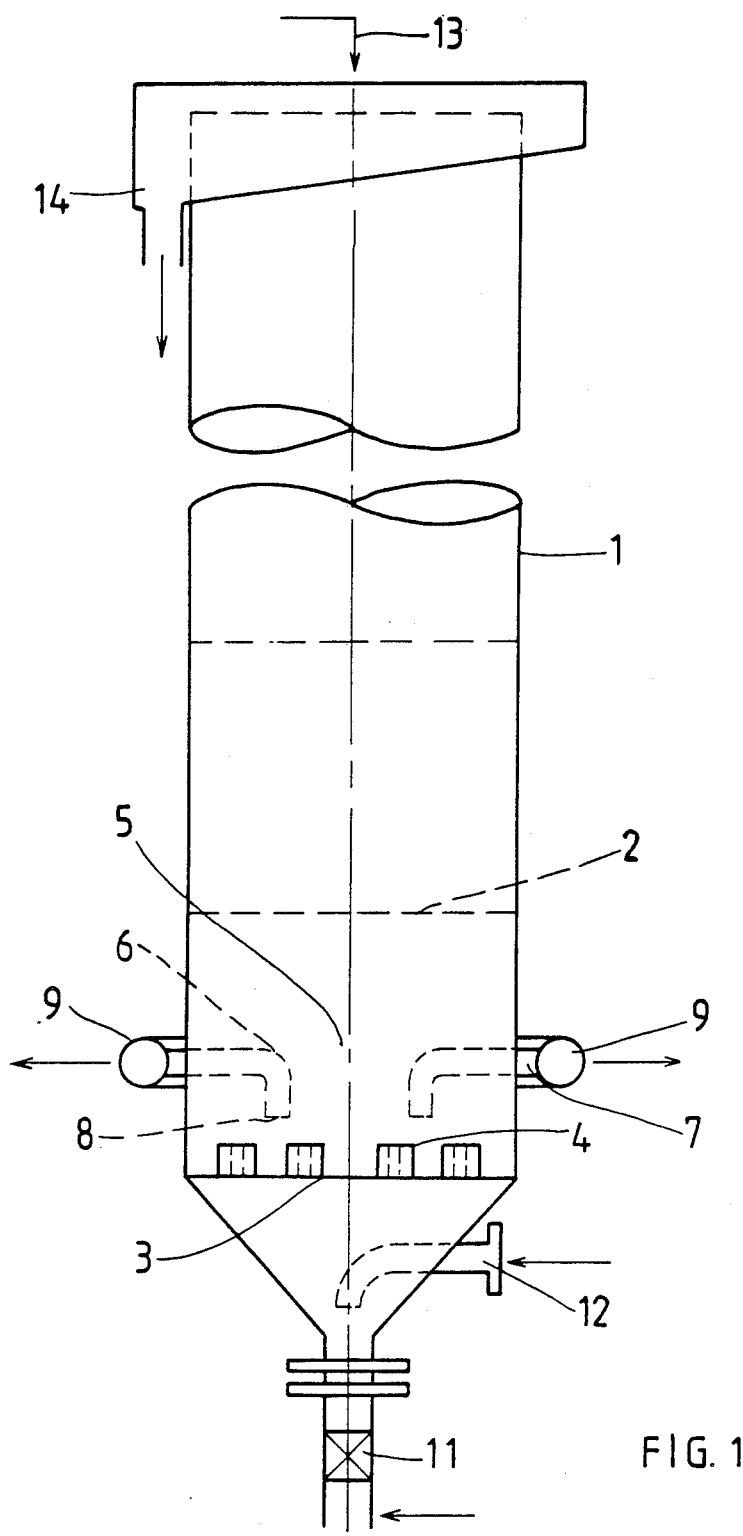
FIG. 1 is a schematic elevation of a multi-stage fluid/solid contacting column according to the invention; and, FIG. 2 is a plan view of the column illustrating the solid adsorbent outlet arrangement.
Figure 2:
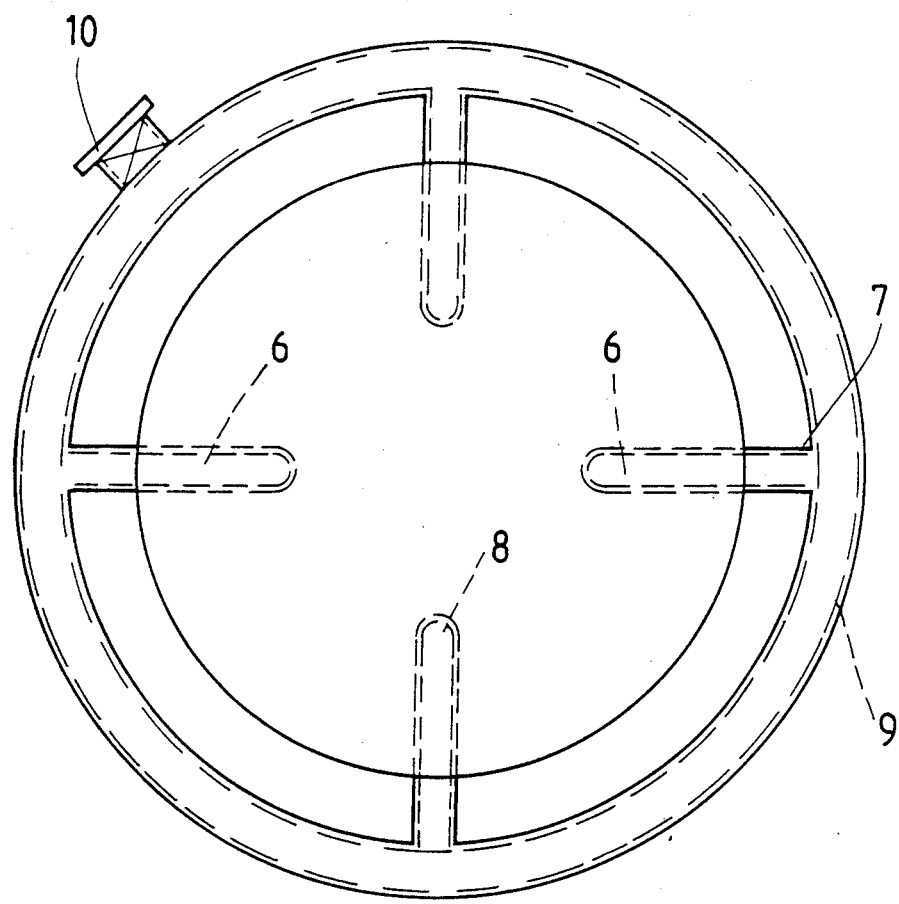

In this embodiment of the invention a solid/liquid contacting column for the contacting of solid adsorbent, such as activated carbon, with a liquid containing a compound to be adsorbed thereon, is illustrated in FIG. 1. The column, generally indicated by numeral 1, has a plurality of vertically spaced plates or trays 2 which, conveniently, are simply perforated plates. However, the perforated plates could be replaced by plates having other communication passages wherethrough liquid is allowed to flow upwardly during a forward part of a cycle and solids together with liquid can flow downwardly in a reverse part of the cycle.

Irrespective of the construction of the spaced plates 2, a lowermost plate 3 is provided with bubble caps 4 for defining the passages through the lowermost plate, the bubble cap plate being designed such that the flow of solids through it does not take place during any part of the cycle, at least to any appreciable extent.

As indicated above, with certain types of adsorbent such as activated carbon, the withdrawal of solid adsorbent through the lowermost plate in conventional manner can lead to an accumulation of solid adsorbent in the space 5 above the lowermost plate 3 and, indeed, some other lower plates or trays.

Instead of this prior art arrangement there are provided four symmetrically disposed outlet pipes 6, the lower open ends 8 of which are directed downwardly and the remainder 7 of each pipe being directed laterally outwardly through the side wall of the column. The four pipes communicate with a manifold pipe 9 having a single discharge valve for the withdrawal of solid adsorbent.

The open ends are, in this case, located at a height of 4.7 inches (120 mm) above the lowermost plate whereas the height between the lowermost plate and next higher plate is 39.4 inches (1.0 m). The open ends of the pipes are thus located at a height of 12% of the plate or tray spacing.

The column is provided with an outlet valve 11 below the lowermost plate 3; a feed solution inlet 12 is also below such lower plate 3; a solid adsorbent inlet 13 at the top of the column, and a barren solution outlet 14 at the top of the column.

It will be understood that, in use, during the forward part of the flow cycle, feed solution which is loaded with a required compound, in this case gold cyanide, dissolved therein is fed into the bottom of the column and passes up through the bubble cap (lowermost) tray 3 and through the perforated plates 2 to exit the column at the outlet 14 for barren solution. The solid adsorbent, in this case activated carbon, enters at the top of the column and is withdrawn as and when required through the outlet pipes 6, into the manifold pipe 9 and thence out through the discharge valve 10.

The column is operated cyclically in the usual way with liquid passing upwardly through the plates in a first or forward part of the cycle; the liquid being substantially stationary in a second or quiescent part of the cycle when solids are allowed to settle onto the plates or trays, and a third or reverse part of the cycle in which liquid flow is reversed in order to move solids downwardly through the perforations in the trays and effect the withdrawal of the solid adsorbent together with associated liquid out of the column through the outlet pipes 6.

In one commercial column of the type described above, and which was used for extracting gold using activated carbon, the column had a diameter of 55.1 inches (1.4 meters), 7 stages and spacing between plates of (39.4 inches (1,0 m). Gold was extracted from a solution containing about 0,121 ppm (parts per million). The barren solution leaving the column contained 0,037 ppm gold. This represented a 70% recovery. The important advantage of the invention is however only really apparent from an examination of the gold loading profile in the different stages. This is shown in Table I below:

TABLE 1

| Typical gold loading profile on carbon along the column of this invention at one commercial gold plant | | |
|---|---|---|
| | Gold loading on carbon | |
| Stage No. | Troy oz/ton | g/tonne |
| 1 (top) | 17.14 | 294 |
| 2 | 29.84 | 512 |
| 3 | 41.50 | 712 |
| 4 | 57.59 | 988 |
| 5 | 77.52 | 1330 |
| 6 | 86.26 | 1480 |
| 7 (bottom) | 98.51 | 1690 |

It will be seen that an extremely well defined progression in the loading is achieved from the top to the bottom stages.

In contradistinction, a commercial column of the type described in U.S. Pat. No. 3,957,635 (the prior art) and having a diameter of 118.11 inches (3,0 meters), 9 stages and a spacing between plates of 39.4 inches (1,0 m) resulted in only 57% of the gold in the feed solution being extracted. In this case the feed solution contained 0,044 ppm gold and the barren solution 0,019 ppm. The important point to note, however, is the relatively poor loading profile along the height of the column which is shown in Table 2 below.

TABLE 2

| Typical gold loading profiles on carbon along a column of the prior art at another commercial gold plant | | | |
|---|---|---|---|
| | Gold loading on carbon | | |
| Stage No. | troy oz | g/tonne | troy oz | g/tonne |
| 1 (top) | 12.36 | 212 | 14.46 | 248 |

TABLE 2-continued

Typical gold loading profiles on carbon along a column of the prior art at another commercial gold plant

| Stage No. | Gold loading on carbon | | | |
|---|---|---|---|---|
| | troy oz | g/tonne | troy oz | g/tonne |
| 2 | 22.56 | 387 | 21.80 | 374 |
| 3 | 17.31 | 297 | 21.97 | 377 |
| 4 | 22.27 | 382 | 23.08 | 396 |
| 5 | 23.02 | 395 | 22.50 | 386 |
| 6 | 23.08 | 396 | 22.50 | 386 |
| 7 | 21.39 | 367 | 20.63 | 354 |
| 8 | 20.40 | 350 | 23.72 | 407 |
| 9 (bottom) | 21.33 | 366 | 23.84 | 409 |

It will be seen that two different profiles were obtained at different times. This was attributed to the carbon accumulating in the lower 5 stages due to its inability to pass through the lowermost tray.

During the forward flow of feed solution, the carbon was redistributed along the column, which resulted in extensive axial mixing and loss of gold loading profile on carbon.

The expedient of this invention therefore provides a simple and yet highly effective solution to the problem.

It will be understood that numerous variations may be made to the above described embodiment of the invention without departing from the scope hereof. In particular, the configuration and nature of the auxiliary outlet pipes 6 can be varied widely and, indeed, only one pipe may be necessary depending upon the column diameter. Also, the lowermost plate need not be a bubble cap tray but could be any other suitable tray preventing the passage of adsorbent solids therethrough during the upflow, settling and reverse flow phases.

I claim:

1. A method of contacting a loaded solution with solids in a multi-stage contacting column comprising:
   providing a series of vertically spaced perforated plates in a column to form stages, said stages including an uppermost stage immediately above the uppermost plate and a lowermost stage between the bottom plate and an intermediate plate immediately thereabove;
   providing outlet duct means separate from said bottom plate in said lowermost stage, said outlet duct means having opening means located at a predetermined height above said bottom plate in said lowermost stage;
   feeding solids into the uppermost stage;
   performing a cycling operation during which said solids move from said uppermost stage to said lowermost stage and then out of the column, said cycling operation comprising the steps of:
   a first flow step of directing a loaded solution from below said bottom plate through said perforations in all said plates so that said loaded solution contacts and fluidizes any of said solids in each said stage while substantially preventing axial mixing of said solids between stages along said column; and
   following said first flow step, a reverse flow step comprising directing solution flow downward through said column to cause a mixture of solution and solids to pass downwardly through the perforations in all of said plates other than said bottom plate so that substantially all of said solids on one plate are moved by said downward flow to the next lower stage, and wherein said reverse flow step includes removing a volume of said solution and solids through said duct means, through amount of said solids in said volume being less than the amount of said solids which passes from one stage to another.

2. The method of claim 1 wherein, said solids contain activated carbon.

3. The method of claim 1, wherein said loaded solution contains dissolved gold values.

4. The method of claim 1 wherein said loaded solution contains gold cyanide.

5. The method of claim 1, wherein each of said ducts includes an open ended pipe extending upwardly and laterally out of the side of said column, said pipe opening having a space above the lowermost plate to define an inlet.

6. The method of claim 1 wherein said flow of said solution and said solids passes through one or more control valves.

7. The method of claim 1, wherein, said duct means includes inlet means at a height above the lowermost plate, said height being about 10% to 15% of the height between said lowermost plate and the next higher plate.

8. The method of claim 1 further comprising the step of terminating upward flow and permitting settling of said solid particles following said first flow step and prior to said reverse flow step.

9. A column for contacting solids and liquids, comprising:
   a plurality of vertically spaced perforated plates arranged to form stages inside a column housing, said plates extending over the entire cross-sectional area of said column housing, and said stages including an uppermost stage above a top plate and a lowermost stage between a bottom plate and a plate immediately thereabove;
   trap means on said bottom plate for allowing flow of liquid and for preventing flow of solids therethrough;
   at least one duct means in said lowermost stage for withdrawing liquids and solids from said column, said duct means being separate and spaced apart from said bottom plate; and
   flow regulating means for regulating the withdrawal of liquids and solids from said column;
   whereby said plates allow liquid to freely move upwardly therethrough, and said plates other than said bottom plate allow solids mixed with liquid to pass downwardly therethrough.

10. The column of claim 9 additionally including a manifold encircling said column in communication with said duct means.

11. The column of claim 10 wherein said flow regulating means is located in said manifold.

12. The column of claim 11, wherein said duct means comprises at least one open ended pipe extending from said manifold inside said column and having a downwardly facing inflow opening for receiving said mixture of liquid and solids.

13. The column of claim 9, wherein said inflow opening of said duct means is located at a height above said bottom plate which is about 10% to 15% of the distance between said bottom plate and said plate thereabove.

* * * * *